(12) United States Patent
Niemi

(10) Patent No.: US 8,800,832 B2
(45) Date of Patent: Aug. 12, 2014

(54) TRAILER TONGUE CARGO CARRIER

(71) Applicant: Russell R. Niemi, Grande Prairie (CA)

(72) Inventor: Russell R. Niemi, Grande Prairie (CA)

(73) Assignee: 1636457 Alberta Ltd., Grande Prairie, Alberta (CA)

( * ) Notice: Subject to any disclaimer, the term of this patent is extended or adjusted under 35 U.S.C. 154(b) by 0 days.

(21) Appl. No.: 13/632,262

(22) Filed: Oct. 1, 2012

(65) Prior Publication Data

US 2013/0092714 A1 Apr. 18, 2013

Related U.S. Application Data

(60) Provisional application No. 61/546,772, filed on Oct. 13, 2011.

(51) Int. Cl.
| | | |
|---|---|---|
| *B60R 9/06* | (2006.01) | |
| *B60P 3/36* | (2006.01) | |
| *B60R 9/00* | (2006.01) | |
| *B60P 3/10* | (2006.01) | |
| *B60R 7/08* | (2006.01) | |
| *B60R 11/00* | (2006.01) | |

(52) U.S. Cl.
CPC ... *B60P 3/36* (2013.01); *B60R 9/00* (2013.01); *B60P 3/10* (2013.01); *B60R 7/08* (2013.01); *B60R 9/06* (2013.01); *B60R 11/00* (2013.01)
USPC .......................................... 224/545; 224/401

(58) Field of Classification Search
CPC .............. B60R 9/06; B60R 9/00; B60R 7/08; B60R 11/00
USPC ...................................................... 224/545, 401
See application file for complete search history.

(56) References Cited

U.S. PATENT DOCUMENTS

| | | | | |
|---|---|---|---|---|
| 2,497,597 A | * | 2/1950 | Gatewood | 224/42.38 |
| 3,779,580 A | * | 12/1973 | Thelen | 280/164.1 |
| 3,889,973 A | * | 6/1975 | Fehseke | 224/401 |
| 4,157,200 A | * | 6/1979 | Johnson | 280/770 |
| 4,277,008 A | * | 7/1981 | McCleary | 224/401 |
| 4,394,947 A | * | 7/1983 | Tartaglia | 224/519 |
| 5,314,200 A | * | 5/1994 | Phillips | 280/400 |
| 5,676,292 A | * | 10/1997 | Miller | 224/524 |
| 5,979,972 A | * | 11/1999 | Gehman | 296/173 |
| 6,089,431 A | * | 7/2000 | Heyworth | 224/521 |
| 6,193,256 B1 | * | 2/2001 | Banary, Jr. | 280/400 |
| 6,513,690 B1 | * | 2/2003 | Churchill et al. | 224/498 |
| 6,715,703 B2 | * | 4/2004 | Kost et al. | 239/687 |
| 7,032,956 B2 | * | 4/2006 | Gehman et al. | 296/168 |
| 8,162,193 B2 | * | 4/2012 | Gang | 224/526 |
| 2003/0173387 A1 | * | 9/2003 | Mitchell | 224/499 |
| 2004/0118890 A1 | * | 6/2004 | Adams et al. | 224/518 |
| 2010/0127027 A1 | * | 5/2010 | Williams | 224/401 |

* cited by examiner

*Primary Examiner* — Brian D Nash
(74) *Attorney, Agent, or Firm* — Davis & Bujold, PLLC; Michael J. Bujold

(57) ABSTRACT

A cargo carrier for a tongue of a trailer has a cargo receiving support with opposed sides, a front and a back. There is a pair of trailer tongue engaging mounts and at least two support legs having an upper end and a lower end. The upper end of each of the support legs is connected to the opposed sides of the cargo receiving support and the lower end of each of the support legs being engaged in the trailer tongue engaging mounts.

12 Claims, 9 Drawing Sheets

TRAILER TONGUE CARGO CARRIER

FIELD

There is described a carrier that enables cargo to be carried on a tongue of a trailer.

BACKGROUND

Cargo space is at a premium on trailers, especially boat trailers and recreational trailers. There is a need for innovative ways of stowing cargo.

SUMMARY

There is provided a cargo carrier for a tongue of a trailer, including a cargo receiving support having opposed sides, a front and a back. A pair of trailer tongue engaging mounts are provided, which mount to the trailer tongue. At least two support legs are provided, each of which has an upper end and a lower end. The upper end of each of the support legs is connected to the opposed sides of the cargo receiving support. The lower end of each of the support legs is engaged in the trailer tongue engaging mounts.

The cargo carrier, described above, mounted to a trailer tongue. It enables electric generators, coolers, and other useful cargo to be carried by the trailer tongue. It mounts close to the front of the trailer, so as to minimize the effect on tongue weight.

Many models of recreational trailer have a curved or angular front profile. In order to accommodate this type of profile, it has been determined that beneficial effects can be obtained when each of the support legs has a dog leg. This results in the lower end of each of the support legs being close to the front of the trailer, while the upper end of each of the support legs is spaced forwardly to accommodate the front profile of the trailer. If support legs engaged cargo receiving support toward the back, cargo receiving support would extend forward in a cantilever fashion. Even when the front of the trailer is vertical, it is preferable that the support legs be dog leg, so that support legs are more centrally positioned between the front and the back of the cargo receiving support.

When attempting to achieve a universal fit, it was determined that tongue width varied, along with front profiles. It was determined that a close to universal fit could be obtained if the legs were capable of pivoting. Even better results may, therefore, be obtained when the upper end of each of the support legs rotates relative to the cargo receiving support and the lower end of the support legs rotates relative to the trailer tongue engaging mounts. This permits mounting to occur, without regard to how close or how far apart the trailer tongue engaging mounts must be positioned.

Once the supports legs were mounted to permit rotation, it became advisable to stabilize the cargo carrier against unwanted movement when loaded with cargo. It was determined that even more beneficial results could be obtained when a brace member was secured to one of the front or the back of the cargo receiving support. The brace member having a lower end secure to the trailer tongue.

In order to permit the brace member to also have a universal fit, two adjustments have been provided. The brace member is vertically adjustable through relative attachment of two components. The brace member also has a number of alternative positions for securing the cargo receiving support.

According to another aspect of there is provided the cargo carrier described above in combination with a tongue of a trailer. While it is anticipated that the above described cargo carrier will be sold as an aftermarket accessory, it is possible that the cargo carrier can be incorporated into the design of a trailer by a trailer manufacturer.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
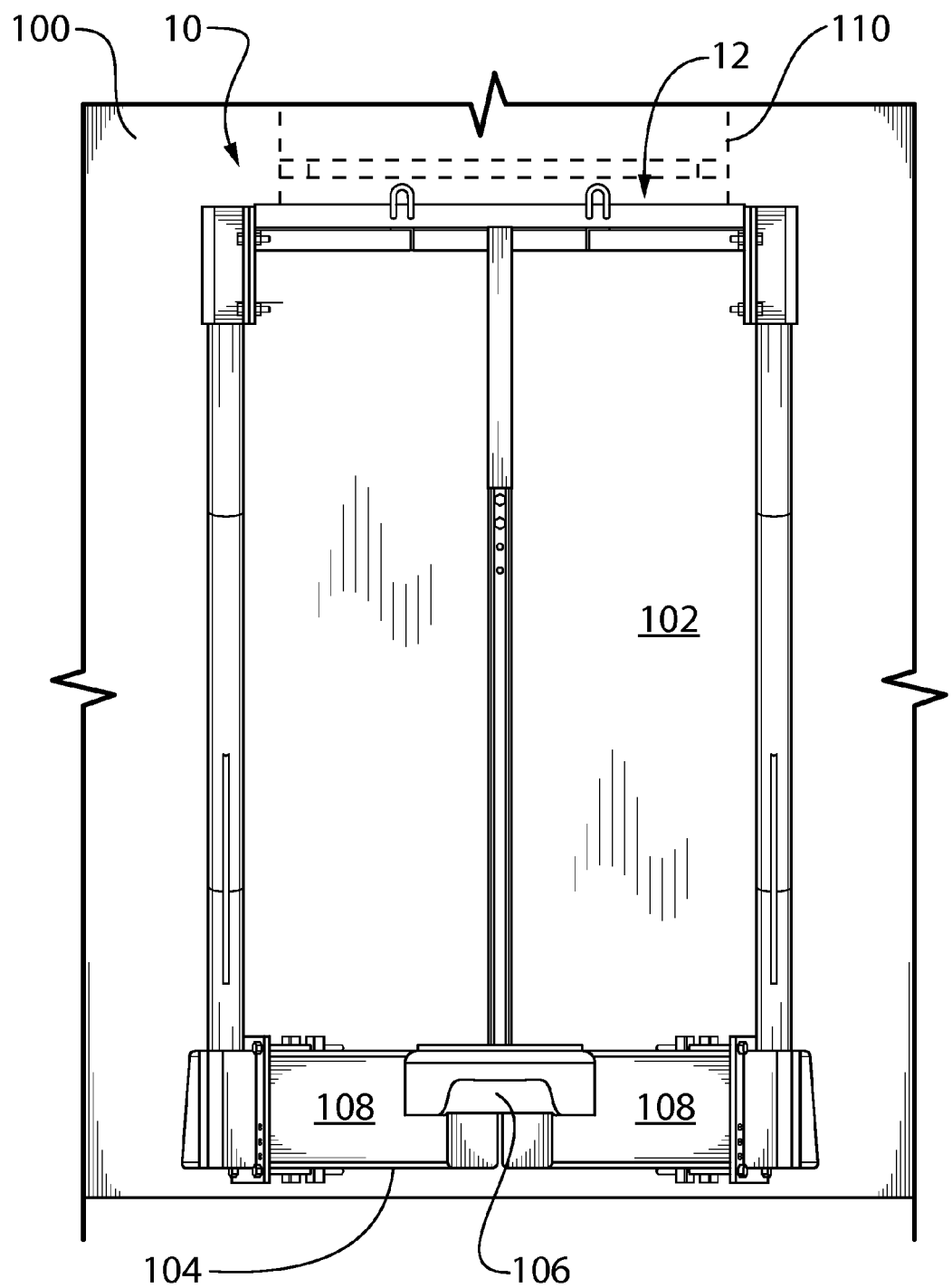
FIG. 1 is a front elevation view of a trailer with the cargo carrier mounted to a tongue of the trailer.

A trailer tongue cargo carrier generally identified by reference numeral 10, will now be described with reference to FIG. 1 through 9.
Structure and Relationship of Parts:

Referring to FIG. 1, cargo carrier 10 will be described with reference to a trailer 100. Trailer 100 has a front 102. A tongue 104 projects past front 102 of trailer 100. Tongue 104 is triangular has an apex which is identified as hitch end 106 and diverging arms 108 which extend under front 102 of trailer 100.

Figure 2:
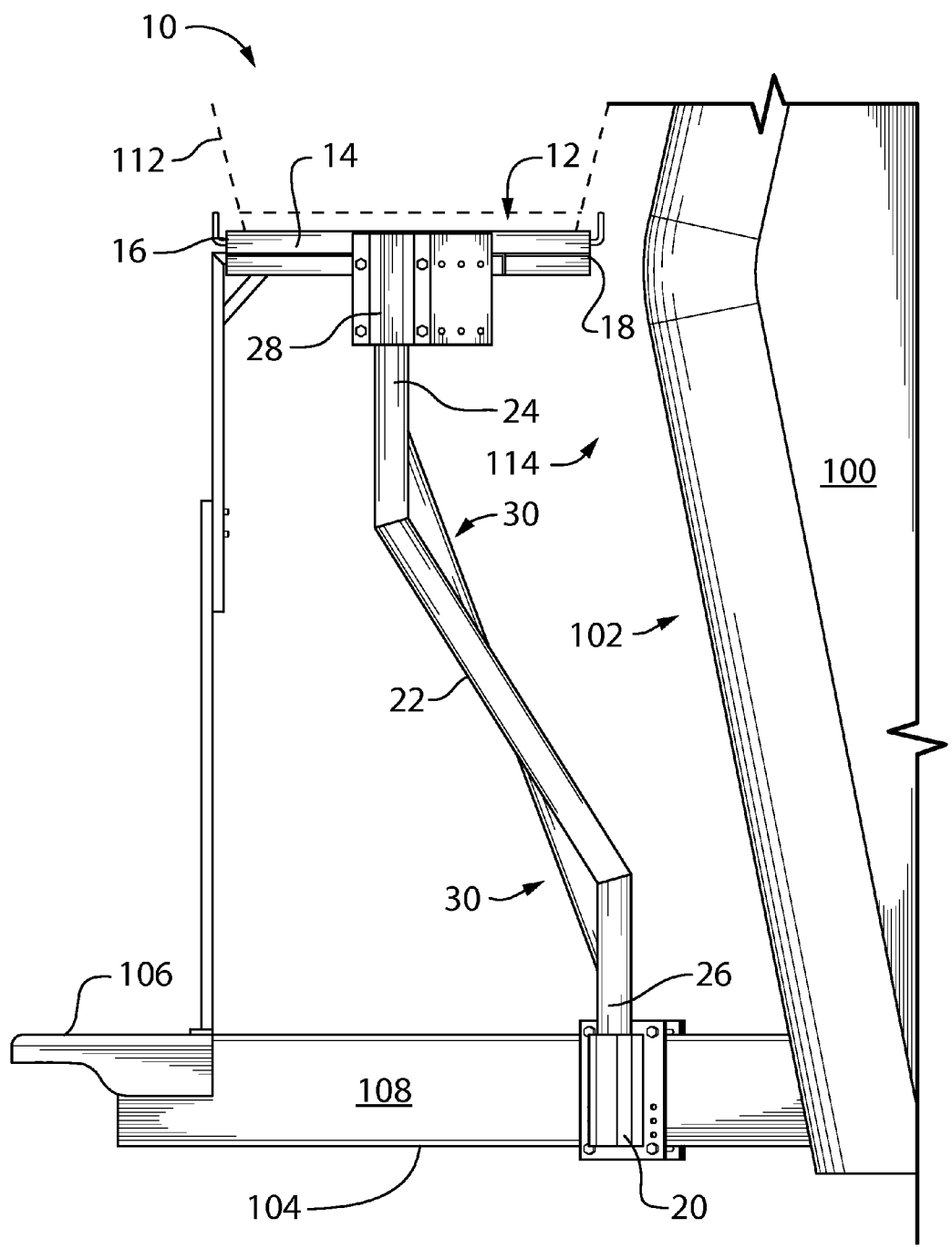
FIG. 2 is a side elevation view of a trailer with the cargo carrier mounted to the tongue of the trailer.

Referring to FIG. 2, cargo carrier 10 includes a cargo receiving support 12 which has opposed sides 14, a front 16 and a back 18. A pair of trailer tongue engaging leg mounts 20 are provided, which mount to arms 108 of trailer tongue 104. Two support legs 22 are provided, each of which has an upper end 24 and a lower end 26. Upper end 24 of each of support legs 22 is connected to an upper leg mount 28 on opposed sides 14 of cargo receiving support 12. Lower end 26 of each of support legs 22 is engaged trailer tongue engaging leg mounts 20.

Referring to FIG. 1, there is illustrated how cargo receiving support 12 of cargo carrier 10 can support an electric generator 110. Referring to FIG. 2, there is illustrated how cargo receiving support 12 of cargo carrier 10 can support a cooler 112. It will be appreciated that there are other types of useful cargo that could be carried by mounting cargo carrier 10 to trailer tongue 104. It is to be noted that cargo carrier 10 mounts close to front 102 of trailer 100, so as to minimize weight on hitch end 106.

Referring to FIG. 2, it is to be noted that front 102 of trailer 100, like many models of recreational trailer, has an angular front profile 114. It is also to be noted that each of support legs 22 has a dog leg 30. This results in lower end 26 of each of support legs 22 being close to front 102 of trailer 100, while upper end 24 of each of support legs 22 is spaced forwardly to accommodate angular profile 114 at front 102 of trailer 100.

Figure 3:
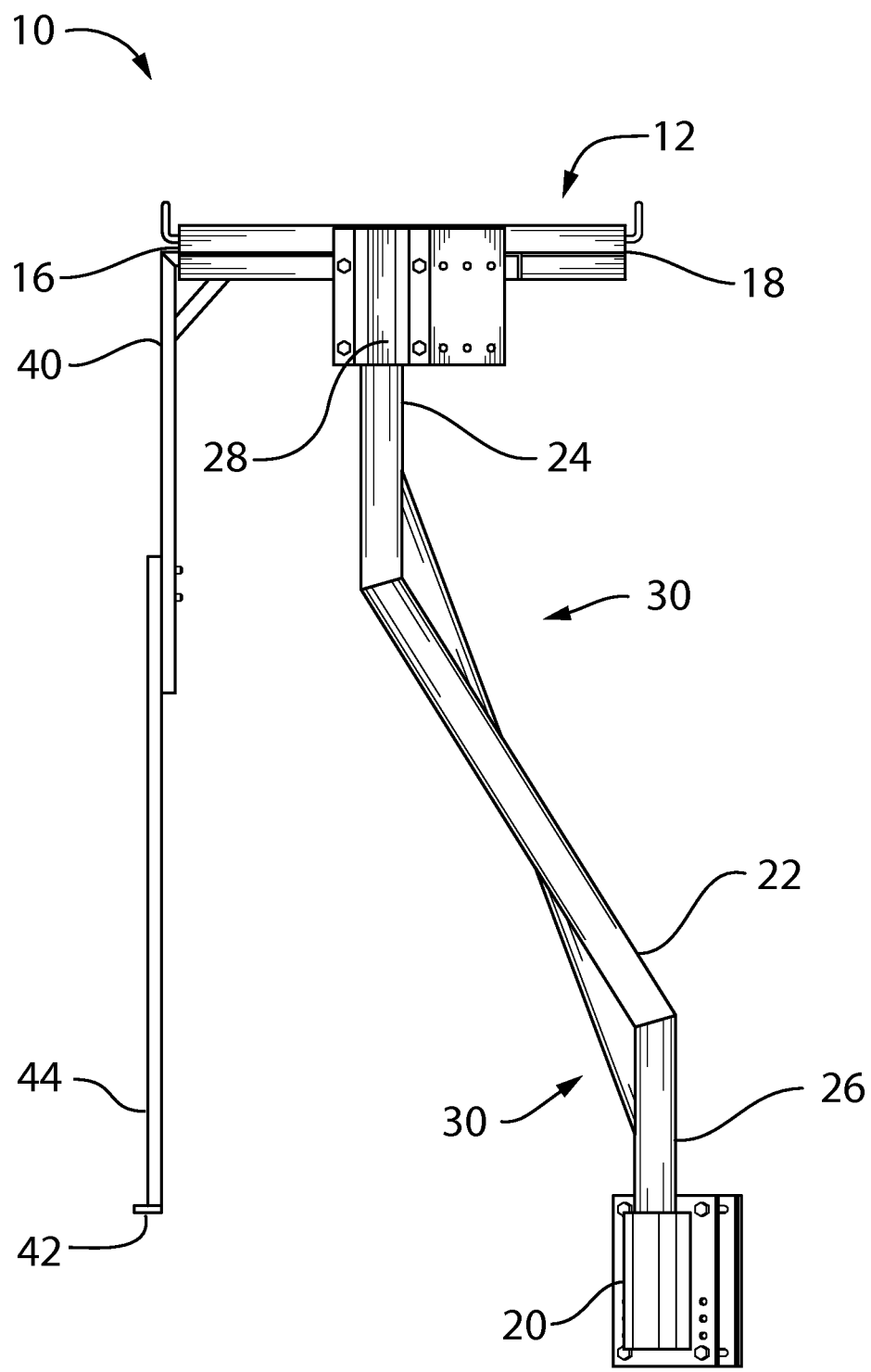
FIG. 3 is a side elevation view of the cargo carrier.

However, if front 102 of trailer 100 were vertical, there would still be an advantage in having support legs 22 with a dog leg 30, so that support legs 22 are more centrally positioned between front 16 and back 18 of cargo receiving support 12; rather than in a cantilever fashion. Referring to FIG. 3, upper leg mounts 28 have more than one mounting position based upon where upper leg mount 28 is bolted to cargo receiving support 12.

Figure 4:
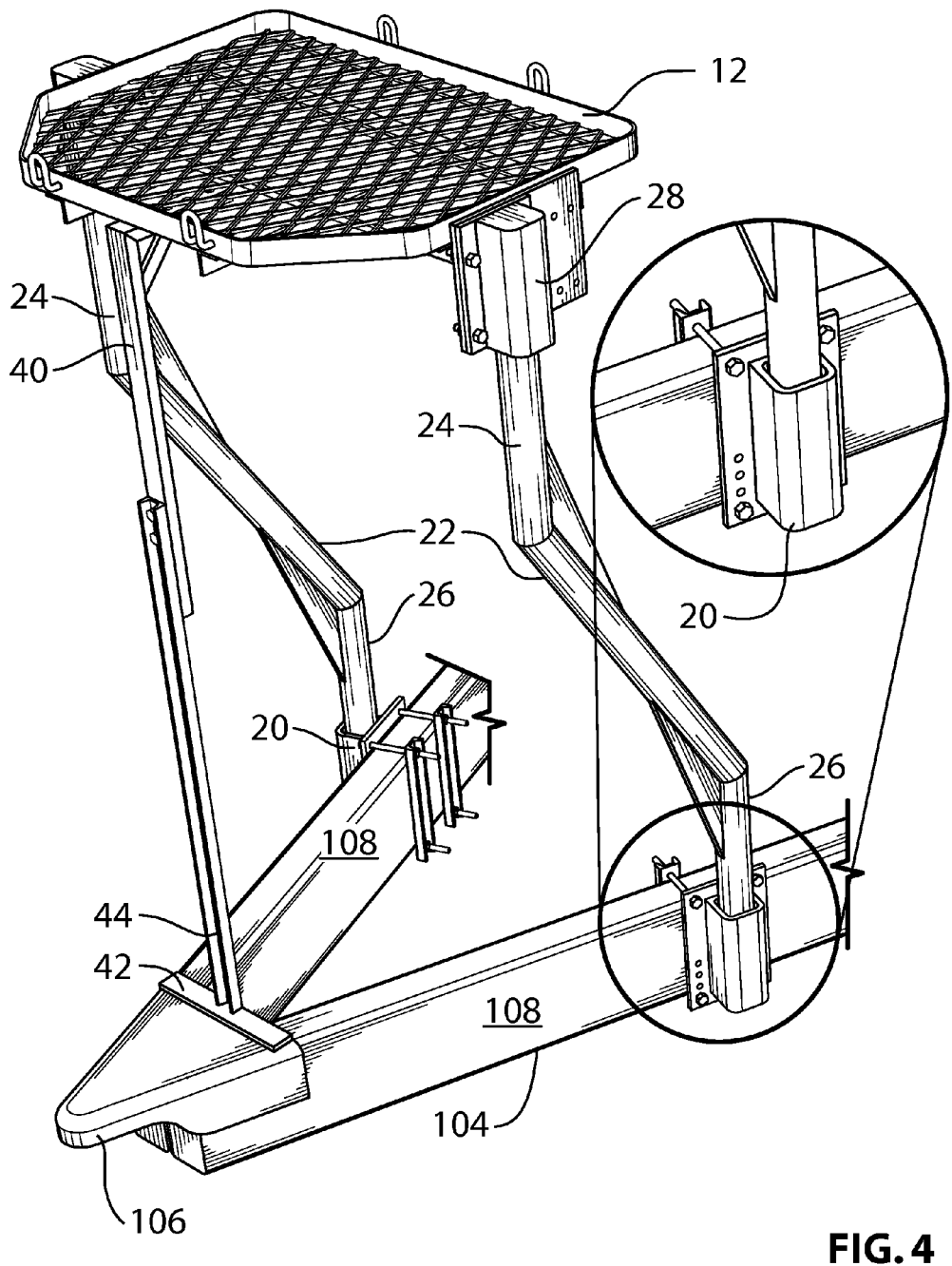
FIG. 4 is a top perspective view of a trailer tongue engaging leg mount of the cargo carrier.
Figure 5:
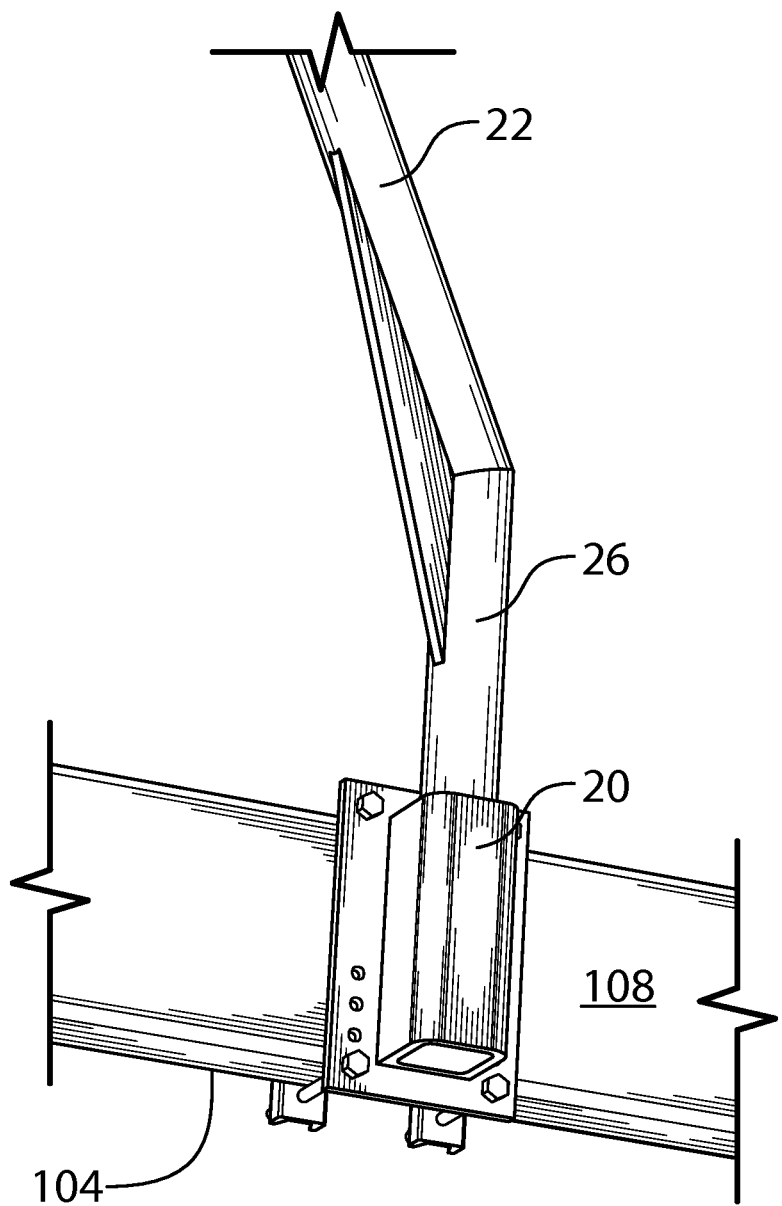
FIG. 5 is a bottom perspective view of a leg mount on the cargo support of the cargo carrier.

Referring to FIG. 4, upper leg mounts 28 have a square interior cross-section and upper end 24 of each of support legs 22 has a round cross-section. This enables upper end 24 of each of support legs 22 to rotate relative to cargo receiving support 12. Referring to FIG. 5, trailer tongue engaging leg mounts 20 have a square interior cross-section and lower end 26 of each of support legs 22 has a round cross-section. This enables lower end 26 of each of support legs 22 to rotate relative to trailer tongue engaging leg mounts 20. This permits support legs 22 to swing and allows mounting to occur, without regard to how close or how far apart trailer tongue engaging leg mounts 20 are positioned when secured to arms 108 of trailer tongue 104. Referring FIG. 6, the manner of securing trailer tongue engaging leg mounts 20 to arms 108 of trailer tongue 104 is illustrated. Bolts 32 extend through apertures 34 in trailer tongue engaging leg mounts 20 and extend through apertures 35 in backing plates 36 by nuts 38. This clamps arms 108 between trailer tongue engaging leg mounts 20 and backing plates 36.

Figure 7:
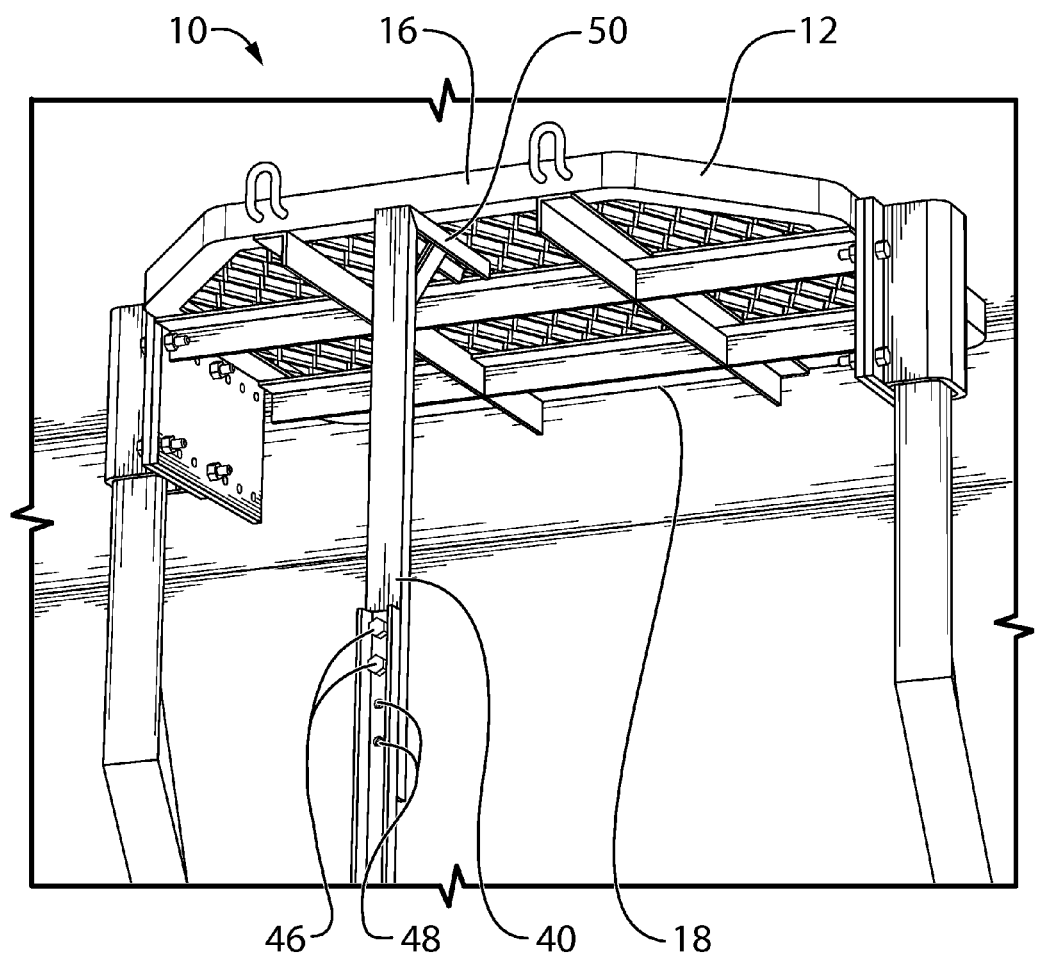
FIG. 7 is a front perspective view of a brace for the cargo support of the cargo carrier mounted on a trailer tongue.
Figure 8:
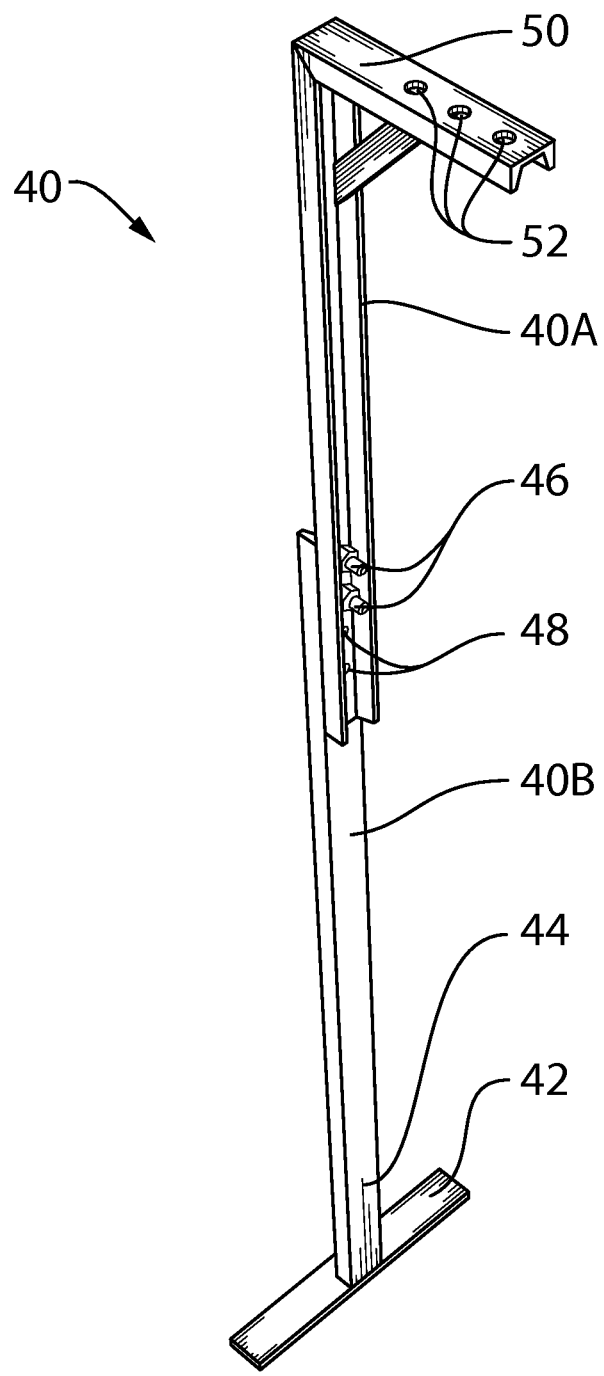
FIG. 8 is a perspective view of the brace for the cargo support illustrated in FIG. 7.

Referring to FIG. 7, in order to stabilize cargo receiving support 12 of cargo carrier 10 against unwanted lateral movement, a brace member 40 is secured to front 16 of cargo receiving support 12. It is to be noted that brace member 40 could have been secured to back 18 of cargo receiving support instead of to front 16. Referring to FIG. 4, brace member 40 extends down and engages trailer tongue 104. Brace member 40 is illustrated with a cross-piece 42 located at lower end 44. Cross-piece 42 is secured to trailer tongue 104, preferably with clamps (not shown). Referring to FIG. 8, brace member 40 is provided with two areas of adjustment. Brace member 40 is vertically adjustable through selective relative attachment of two components 40A and 40B. Referring to FIG. 7, the attachment is made by extending bolts 46 through selected ones of apertures 48. Referring to FIG. 8, brace member 40 also has an upper attachment plate 50, which has a series of apertures 52 which provide a number of alternative positions for securing cargo receiving support 12.

Figure 9:
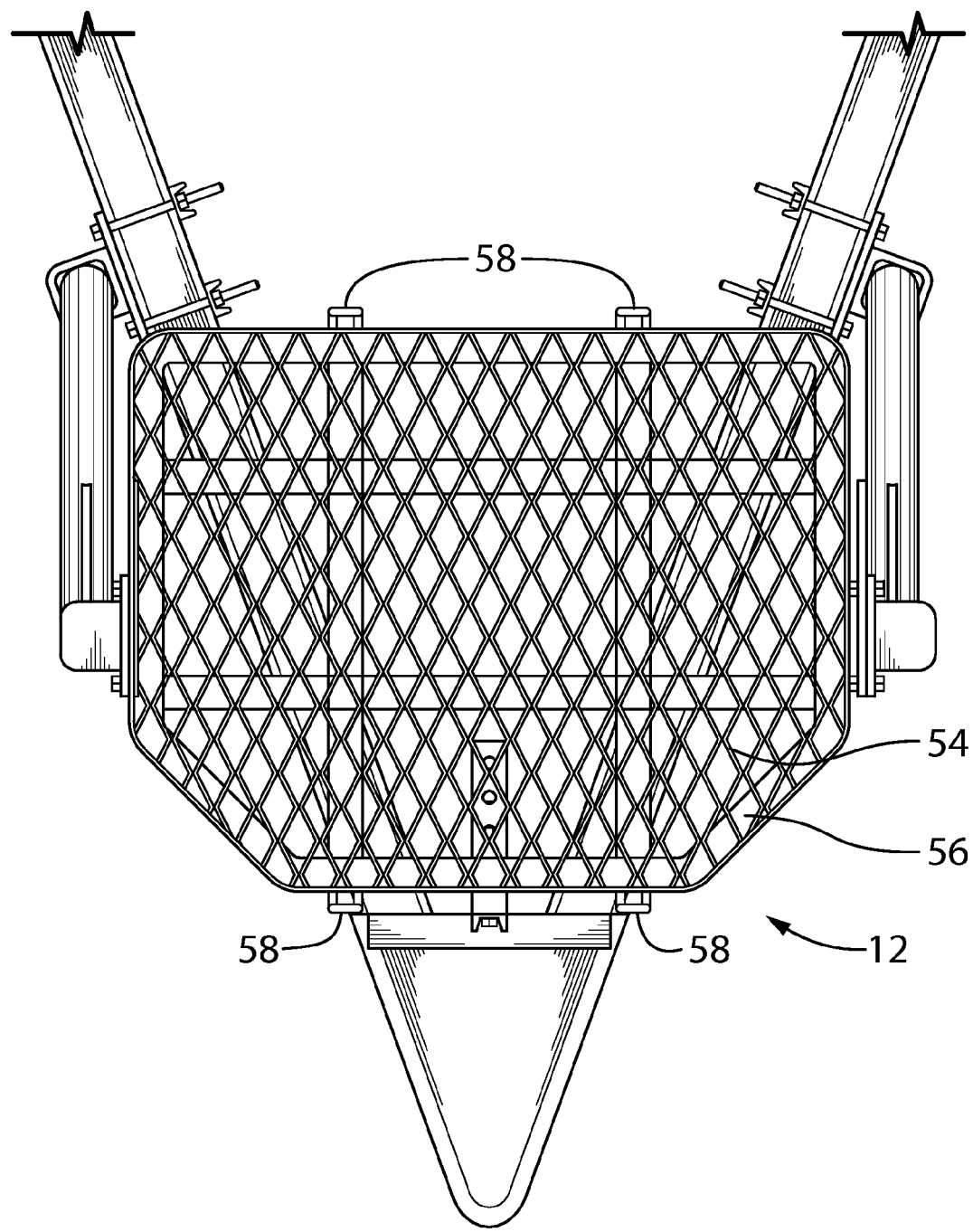
FIG. 9 is a top plan view of a cargo support of the cargo carrier.

Referring to FIG. 9, cargo receiving support 12 has a metal grid 54 that rests upon and is welded to a peripheral edge support 56. Cargo receiving support 12 has metal loops 58 welded in position. Metal loops 58 are used to secure cargo onto cargo receiving support 12 with ropes, straps, cables, bungee cords, and the like.

Figure 6:
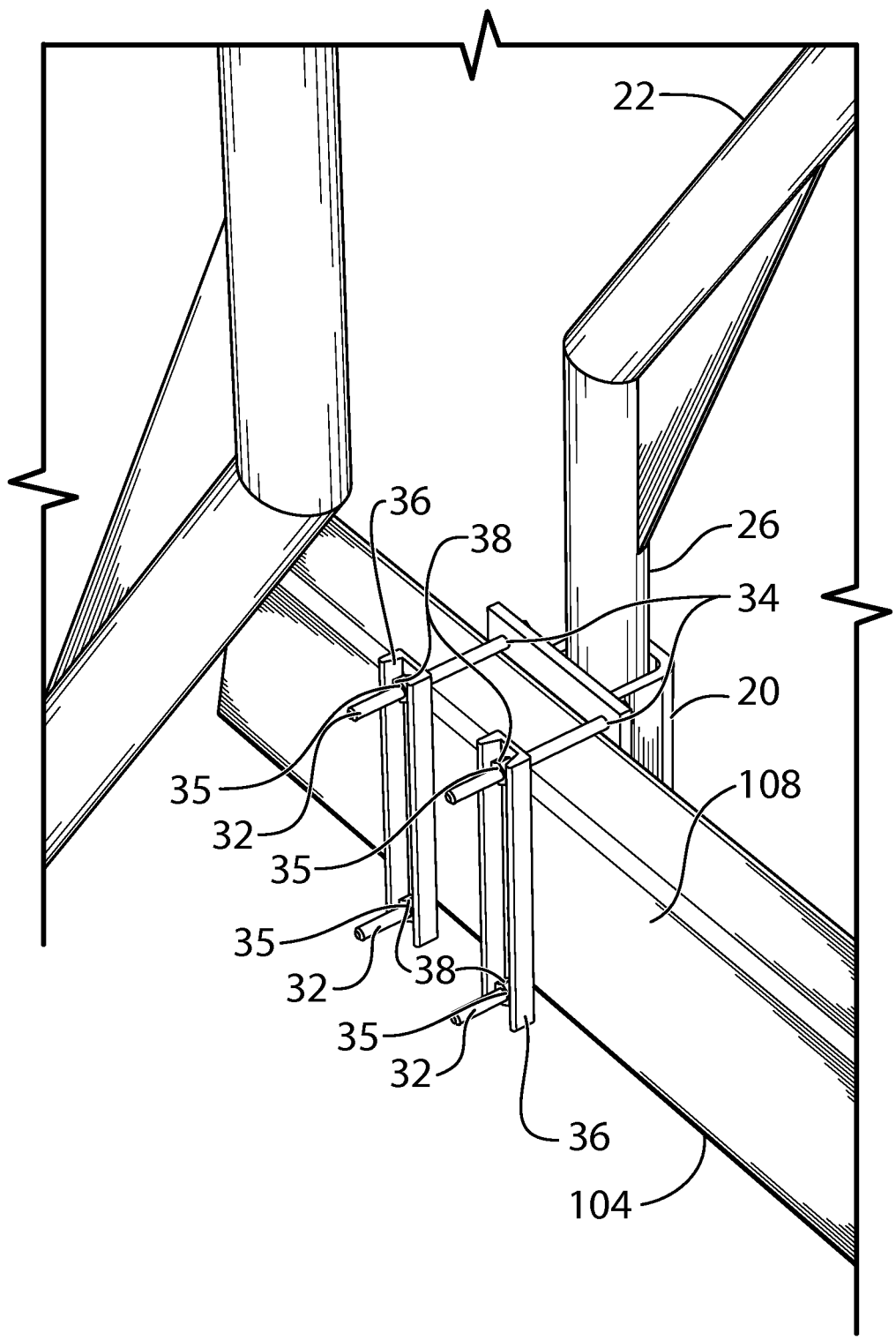
FIG. 6 is a rear perspective view of a trailer tongue engaging leg illustrated in FIG. 4.

Operation:

Referring to FIG. 2, trailer tongue engaging leg mounts 20 are mounted to arms 108 of trailer tongue 104 near front 102 of trailer 100. Referring to FIG. 6, trailer tongue engaging leg mounts 20 are mounted to arms 108 by extending bolts 32 through apertures 34 in trailer tongue engaging leg mounts 20 and through apertures 35 in backing plates 36. Nuts 38 are then used to clamp arms 108 between trailer tongue engaging leg mounts 20 and backing plates 36. There is some adjustment possible by selecting apertures in trailer engaging leg mounts 20 and in backing plates 36 through which to extend bolts 32. Lower end 26 of each of support legs 22 is then positioned in trailer tongue engaging leg mounts 20. Referring to FIG. 3, support legs 22 are rotated to permit upper end 24 of each of support legs 22 to be inserted into upper leg mounts 28 of cargo receiving support 12. Referring to FIG. 7, brace member 40 is then secured to cargo receiving support 12 and to trailer tongue 104 (not shown in this view) to stabilize cargo carrier 10. Referring to FIG. 8, should vertical adjustment of brace member 40 be required, the relative attachment of components 40A and 40B is altered, by extending bolts 46 through selected ones of apertures 48. Cargo receiving support 12 (not shown in this view) is then secured by bolts to selected apertures 52 in upper attachment plate 50. Referring to FIG. 9, cargo receiving support 12 is then in position to receive cargo. Examples of typical cargo are electric generator 110 (as illustrated in FIG. 1) or cooler 112 (as illustrated in FIG. 2).

Advantages:

When cargo supports are secured to a side of a trailer, this has an adverse effect upon width clearance. When cargo supports are secured to a roof of a trailer, this has an adverse effect upon height clearance. When cargo supports are secured to a rear of a trailer, they can have an adverse effect upon rear access. In contrast, cargo support 10, as described above, does not raise any clearance or access issues.

Cautionary Warnings:

It must be noted that there is a limit of how much cargo one places on cargo support 10. Those would work with trailers will understand the effect of too much or too little tongue weight during towing. There is an acceptable range for tongue weight. One must not intentionally overload cargo support 10, and thereby place excessive weight upon the trailer tongue.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The illustrated embodiments have been set forth only as examples and should not be taken as limiting a purposive interpretation of the claims.

What is claimed is:

1. A cargo carrier for a tongue of a trailer, the tongue having angled sides, comprising:
    a cargo receiving support having opposed sides, a front and a back;
    a pair of trailer tongue engaging mounts that attach directly to the angled sides of the trailer tongue;
    at least two support legs having an upper end and a lower end, the upper end of each of the support legs being connected to the opposed sides of the cargo receiving support and the lower end of each of the support legs being engaged in the trailer tongue engaging mounts and immediately adjacent to the angled sides of the trailer tongue.

2. The cargo carrier of claim 1, wherein each of the support legs has a dog leg.

3. The cargo carrier of claim 2, wherein the upper end of each of the support legs comprises a rotatably adjustable connector such that the support legs rotate relative to the cargo receiving support and the lower end of the support legs rotates relative to the trailer tongue engaging mounts.

4. The cargo carrier of claim 3, wherein a brace member is secured to one of the front or the back of the cargo receiving support.

5. The cargo carrier of claim 4, wherein the brace member is vertically adjustable through relative attachment of two components.

6. The cargo carrier of claim 4, wherein the brace member has a number of alternative positions for securing the cargo receiving support.

7. In combination:
   a trailer tongue having angled sides;
   a cargo receiving support having opposed sides, a front and a back;
   a pair of trailer tongue engaging mounts attached directly to the angled sides of the trailer tongue;
   at least two support legs having an upper end and a lower end, the upper end of each of the support legs being connected to the opposed sides of the cargo receiving support and the lower end of each of the support legs being engaged in the trailer tongue engaging mounts and immediately adjacent to the angled sides of the trailer tongue.

8. The combination of claim 7, wherein each of the support legs has a dog leg.

9. The combination of claim 8, wherein the upper end of each of the support legs comprises a rotatably adjustable connector such that the support legs rotate relative to the cargo receiving support and the lower end of the support legs rotates relative to the trailer tongue engaging mounts.

10. The combination of claim 9, wherein a brace member is secured to one of the front or the back of the cargo receiving support.

11. The combination of claim 10, wherein the brace member is vertically adjustable through relative attachment of two components.

12. The combination of claim 10, wherein the brace member has a number of alternative positions for securing the cargo receiving support.

\* \* \* \* \*